US012731126B2

(12) United States Patent
Zaki et al.

(10) Patent No.: US 12,731,126 B2
(45) Date of Patent: Sep. 8, 2026

(54) PRESENCE VERIFICATION FOR ELECTRONIC TRANSACTIONS

(71) Applicant: Capital One Services, LLC, McLean, VA (US)

(72) Inventors: Zainab Zaki, Reston, VA (US); Jackson Cheek, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/056,100

(22) Filed: Feb. 18, 2025

(65) Prior Publication Data

US 2025/0190971 A1 Jun. 12, 2025

Related U.S. Application Data

(60) Continuation of application No. 18/200,742, filed on May 23, 2023, now Pat. No. 12,260,389, which is a continuation of application No. 16/929,249, filed on Jul. 15, 2020, now Pat. No. 11,704,657, which is a division of application No. 16/457,296, filed on Jun. 28, 2019, now Pat. No. 10,748,136.

(51) Int. Cl.
*G06Q 20/32* (2012.01)
*G06K 19/06* (2006.01)

(52) U.S. Cl.
CPC ... *G06Q 20/3276* (2013.01); *G06K 19/06028* (2013.01); *G06K 19/06037* (2013.01); *G06Q 20/3224* (2013.01)

(58) Field of Classification Search
None
See application file for complete search history.

(56) References Cited

U.S. PATENT DOCUMENTS 7,628,325 B2 12/2009 McIntosh
8,490,871 B1 * 7/2013 Miller ................. H04L 63/0853 235/375
8,924,712 B2 12/2014 Varadarajan et al.
9,191,213 B2 11/2015 Tredoux et al.
9,300,658 B1 3/2016 Sadacharam et al.
10,176,474 B2 * 1/2019 Wong ..................... G06Q 30/00
(Continued)

FOREIGN PATENT DOCUMENTS

EP 2747363 A1 * 6/2014 ......... G06Q 20/3276
EP 3276555 A1 * 1/2018 ........... G06Q 20/208
(Continued)

OTHER PUBLICATIONS

Alqerem, A., et al., “Location Dependent Transaction for Mobile Environment.” 2006 2nd International Conference on Information and Communication Technlogies, Information and Communication Technologies, 2006 (Year: 2006).

*Primary Examiner* — Daniel S Felten
(74) *Attorney, Agent, or Firm* — Banner & Witcoff, Ltd.

(57) ABSTRACT

Systems, apparatuses, and methods for verifying physical presence of a mobile device as part of an electronic transaction. Tags may be generated and displayed on one or more display devices. Those tags, which may be time-limited, may be read by a mobile device to verify physical presence of the mobile device as a prerequisite to initiating, continuing with, or completing an electronic transaction, and/or as a decision point in how the electronic transaction is to be conducted.

20 Claims, 7 Drawing Sheets

(56) References Cited

U.S. PATENT DOCUMENTS

| | | | | |
|---|---|---|---|---|
| 10,445,630 | B1 * | 10/2019 | Lin | G06K 19/06037 |
| 10,748,136 | B1 * | 8/2020 | Zaki | G06Q 20/3276 |
| 10,943,225 | B2 * | 3/2021 | Flurscheim | G06Q 20/3276 |
| 11,756,025 | B2 * | 9/2023 | Brightman | G06Q 10/40 705/42 |
| 2013/0212017 | A1 | 8/2013 | Bangia | |
| 2013/0218766 | A1 | 8/2013 | Mueller | |
| 2013/0238456 | A1 * | 9/2013 | Soysa | G06Q 20/387 705/21 |
| 2013/0297422 | A1 | 11/2013 | Hunter et al. | |
| 2014/0081858 | A1 | 3/2014 | Block et al. | |
| 2014/0101036 | A1 | 4/2014 | Phillips et al. | |
| 2014/0180960 | A1 | 6/2014 | Sagfors et al. | |
| 2015/0149307 | A1 | 5/2015 | Thukral | |
| 2016/0021091 | A1 | 1/2016 | Hoyer et al. | |
| 2016/0155112 | A1 | 6/2016 | Phillips et al. | |
| 2017/0032370 | A1 * | 2/2017 | Beltramino | G06Q 20/20 |
| 2018/0322499 | A1 * | 11/2018 | Azam | G06Q 20/20 |
| 2020/0410475 | A1 * | 12/2020 | Zaki | G06Q 20/3276 |
| 2023/0259936 | A1 * | 8/2023 | Roffey | G06Q 20/208 705/69 |
| 2024/0029050 | A1 * | 1/2024 | Brightman | G06Q 10/40 |

FOREIGN PATENT DOCUMENTS

| | | | | |
|---|---|---|---|---|
| WO | 2013126675 | A2 | 8/2013 | |
| WO | WO-2013155536 | A1 * | 10/2013 | G06Q 20/3278 |
| WO | WO-2021239966 | A1 * | 12/2021 | G06Q 30/0238 |

* cited by examiner

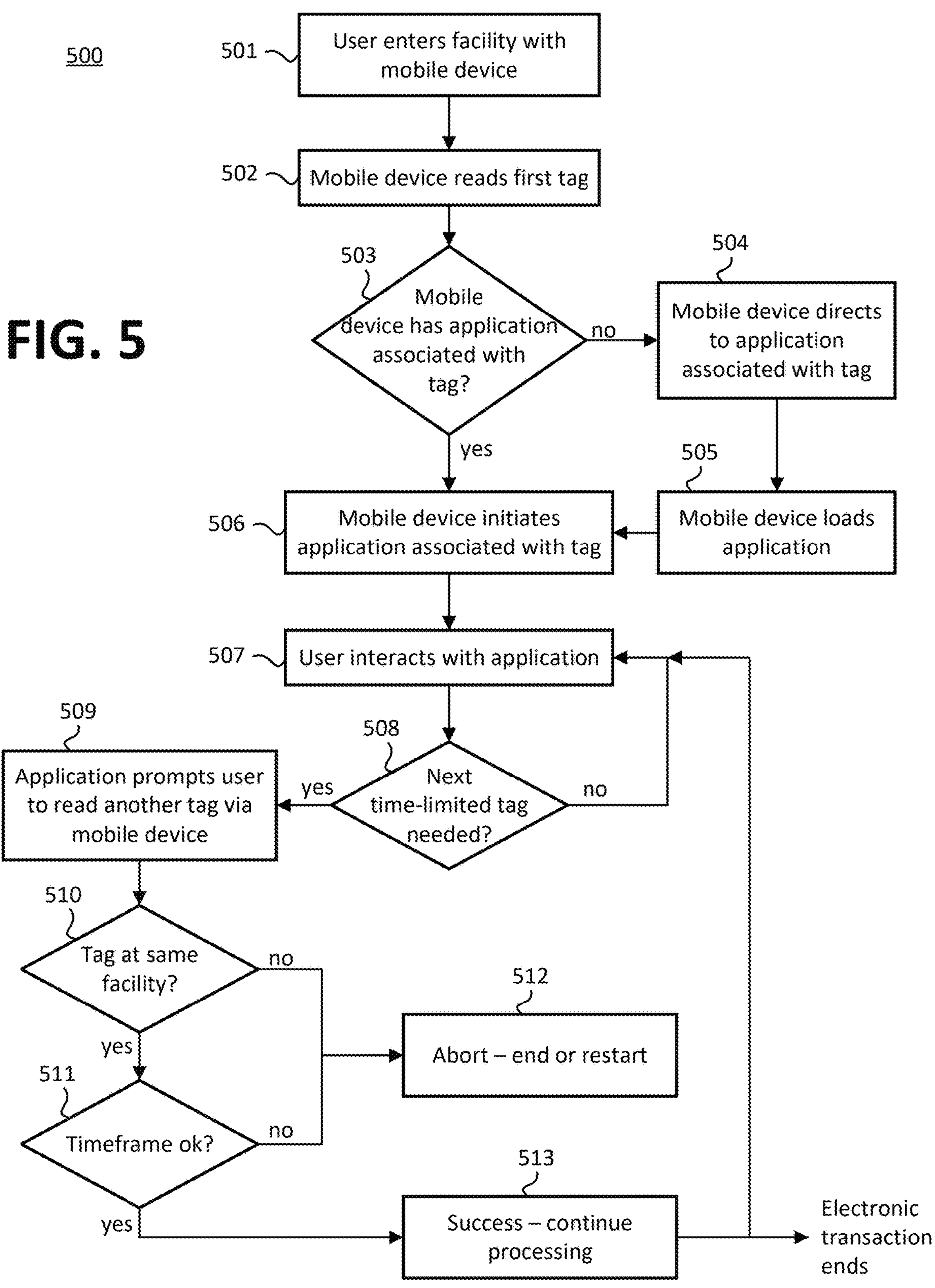
500
FIG. 5
501
User enters facility with mobile device
502
Mobile device reads first tag
503
Mobile device has application associated with tag?
no
504
Mobile device directs to application associated with tag
yes
505
Mobile device loads application
506
Mobile device initiates application associated with tag
507
User interacts with application
509
508
Application prompts user to read another tag via mobile device
yes
Next time-limited tag needed?
no
510
Tag at same facility?
no
512
Abort – end or restart
yes
511
Timeframe ok?
no
513
yes
Success – continue processing
Electronic transaction ends

PRESENCE VERIFICATION FOR ELECTRONIC TRANSACTIONS

CROSS-REFERENCE TO RELATED APPLICATIONS

The present application is a continuation of U.S. patent application Ser. No. 18/200,742, filed May 23, 2023, which is a continuation of U.S. patent application Ser. No. 16/929,249, filed Jul. 15, 2020, which is a divisional of U.S. patent application Ser. No. 16/457,296, filed Jun. 28, 2019, each of which is hereby incorporated by reference in its entirety.

FIELD OF USE

Aspects of the disclosure relate generally to verifying physical presence of a mobile device as part of an electronic transaction. More specifically, aspects of the disclosure are directed to generating and using tags that may be read by a mobile device to verify physical presence of the mobile device as a prerequisite to initiating, continuing with, or completing an electronic transaction, and/or as a decision point in how the electronic transaction is to be conducted.

BACKGROUND

In just the last decade, society has become reliant on the ubiquitous smart phone. Mobile phones, once used merely for making telephone calls and exchanging text messages, are now used in innumerable ways. For example, users can now access their home security systems, view live video cameras, access confidential documents, purchase goods and services, and transfer money, all from the convenience of their phones. The user does not even need to leave his or her home when conducting these transactions. In many cases, this flexibility to conduct transactions independent of the user's location can be wonderfully efficient. In other cases, however, this location-independent ability to conduct transactions can be problematic.

Aspects described herein may address these and other problems, and generally improve the quality, efficiency, and speed of electronic transaction systems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

For some transactions, it is not always appropriate that the user's location cannot be verified, or that the user is not physically present at a predetermined location during the transaction. For example, certain information, which may be accessible via a smart phone or other computing device, may not be appropriate for viewing outside of a designated area. Such information may include taxpayer information, confidential corporate information, and the like. As another example, it may be desirable that a user be able to electronically access a physical security system only while the user is near the area being secured. As a further example, it may be desirable (or even required by regulation) to have a user physically present to conduct certain financial transactions such as completing purchases, transferring money, and opening bank accounts. However, rather than prohibit the user from conducting these transactions via a mobile device altogether, it would be efficient to allow at least a portion of transaction to be conducted via mobile device when it can be verified that the user is physically present at a predetermined location. Alternatively, it would be efficient to allow the transaction to proceed in a first way (for example, using a first version of the transaction) when the user is not verified as being physically present, and allowing the transaction to proceed in a second way (for example, using a different second version of the transaction) when the user is verified as being physically present. This may be helpful where certain steps of the transaction are appropriate for location-independent processing and others steps require physical presence, or where the transaction is appropriate to proceed with extra security measures (e.g., requesting additional information from the user, or implementing more stringent transaction acceptance eligibility rules) when the user is non-present as compared with when the user is physically present.

Accordingly, aspects described herein may allow for verifying physical presence of a mobile device as part of an electronic transaction. More specifically, aspects of the disclosure are directed to generating and using tags that may be read by a mobile device to verify physical presence of the mobile device as a prerequisite to initiating, continuing with, or completing an electronic transaction, and/or as a decision point in how the electronic transaction is to be conducted. This may allow location-based control of the electronic transaction. For instance, the electronic transaction may only be initiated, or allowed to proceed, if the mobile device is verified as being present at a particular location and/or if the mobile device is verified as remaining at the location during at least one or more portions of the electronic transaction. As another example, the electronic transaction may be conducted in different ways (for example, using different versions of the electronic transaction) depending upon whether the mobile device is verified as being physically present at a particular location. For example, the electronic transaction may be performed in a first way (e.g., with a first one or more transaction steps) if the mobile device has been verified as being physically present at a particular location, or in a second way (e.g., with a second one or more transaction steps) if the mobile device has not been verified as being physically present at the particular location. More specifically, for example, the electronic transaction may require additional steps, or have a higher level of scrutiny, or request further information from the user if the mobile device has not been verified as being physically present, as compare with when the mobile device has been verified as being physically present. This may be useful for a variety of electronic transactions, including but not limited to point-of-sale transactions, secure physical location access transactions, confidential data access transactions, and banking transactions.

More particularly, some aspects described herein may provide a method, apparatus, and system for generating, by at least one computing device, and for display by a plurality of display devices, a plurality of tags each comprising information indicating a different token and a location associated with one of the plurality of display devices displaying the tag; receiving, from a mobile device of a user, an indication that a first tag, of the plurality of tags, was read from one of the plurality of display devices by the mobile device; determining whether the first tag is valid; determining, based on whether the first tag is valid, a risk profile; and causing the mobile device to display a user interface for performing a transaction associated with management of a bank account, wherein content of the user interface is based on the risk profile. Computer-readable instructions, stored on one or more computer-readable media, may be used for implementing these aspects.

Further aspects described herein may provide a method, apparatus, and system for generating, by at least one computing device, and for display by a plurality of display devices, a plurality of tags each comprising information indicating a location associated with one of the plurality of display devices displaying the tag, wherein the plurality of tags comprises a first tag and a second tag. An indication may be received, from the mobile device, that the first tag was read from one of the plurality of display devices by the mobile device. A user interface of the mobile device may be enabled to perform a transaction based on the information in the first tag indicating that the mobile device is at a first location. An indication may further be received, from the mobile device, that the second tag was read from one of the plurality of display devices by the mobile device. After a determination that the first tag and the second tag comprise information indicating a same location and that a time difference between the first tag and the second tag satisfies a predetermined timeframe criterion, the transaction may be approved and/or a message may be sent to the mobile device to indicate that the transaction is successful. Computer-readable instructions, stored on one or more computer-readable media, may be used for implementing these further aspects.

Further aspects described herein some aspects described herein may provide a mobile device that comprises a camera, at least one processor, and memory storing instructions that, when executed by the at least one processor, cause the mobile device to read, using the camera, a first tag of a plurality of tags displayed by a display device, wherein each of the plurality of tags is separately displayed for a predetermined period of time and comprises information indicating a location of the display device and a token, and wherein the token of each of the plurality of tags is indicative of a particular time associated with the respective tag of the plurality of tags; send a first message indicating the location and the token of the first tag; perform, based on a response to the first message received by the mobile device, a transaction; read, using the camera, a second tag of the plurality of tags, wherein the second tag is displayed by the display device after the first tag is displayed by the display device; and display to a user, after a determination that the first tag and the second tag comprise information indicating a same location and that a time difference between the token of the first tag and the token of the second tag satisfies a predetermined timeframe criterion, an indication that the transaction is successful. A method is also provided for performing these further aspects.

Still further aspects described herein may provide a system that comprises a plurality of display devices and at least one computing device. The plurality of display devices may each be at a different location and may each be configured to display a plurality of optically-readable codes, wherein each of the plurality of optically-readable codes is displayed for a predetermined period of time before being replaced with another of the plurality of optically-readable codes, and wherein each of the plurality of optically-readable codes encodes a location of a respective one of the plurality of display devices that displays the optically-readable code and a token that is different for each of the plurality of optically-readable codes. The at least one computing device may be configured to determine that a mobile device has optically read a first optically-readable code of the plurality of optically-readable codes; determine that the mobile device has optically read a second optically-readable code of the plurality of optically-readable codes; determine whether a location encoded by the first optically-readable code matches a location encoded by the second optically-readable code; determine, based on the token of the first optically-readable code and the token of the second optically-readable code, whether a time difference between the first optically-readable code and the second optically-readable code satisfies a predetermined timeframe criterion; approve a transaction, performed via the mobile device, based on determining that the location encoded by the first optically-readable code matches a location encoded by the second optically-readable code and that the time difference satisfies the predetermined time criterion; and send a message to the mobile device indicating approval of the transaction. A method is also provided for performing these further aspects.

According to some embodiments, the tags may each comprise, for example, quick-response (QR) codes, bar codes, and/or any other types of tags that may be optically readable by a camera of a mobile device. The tags may additionally or alternatively comprise, for example, tags that are readable by the mobile device in other (e.g., non-optical) ways, such as audible tags, and/or near-field communication (NFC) tags and/or other types of tags that communicate using wireless electromagnetic signals. The tags may include information, such as in the form of a token, wherein the token of a first tag is indicative of a first time and the token of a second tag is indicative of a second time, and wherein a time difference (for instance, a difference between the second time and the first time) is measured between the two tags and used to determine whether the second tag was within a predetermined timeframe of the first tag. One or more of the tags may further include information indicative of a particular software application to be executed by the mobile device, and/or a particular configuration to be enabled on the mobile device, in order to conduct the electronic transaction.

Corresponding apparatus, systems, and computer-readable media of any of the above aspects are also within the scope of the disclosure.

These features, along with many others, are discussed in greater detail below.

BRIEF DESCRIPTION OF THE DRAWINGS

The present disclosure is illustrated by way of example and not limited by the accompanying figures, in which like reference numerals indicate similar elements, and in which:

FIG. 5 depicts a flow chart for an example method for using one or more tags to configure a mobile device, implement an electronic transaction, and/or verify user presence;

DETAILED DESCRIPTION

Figure 1:
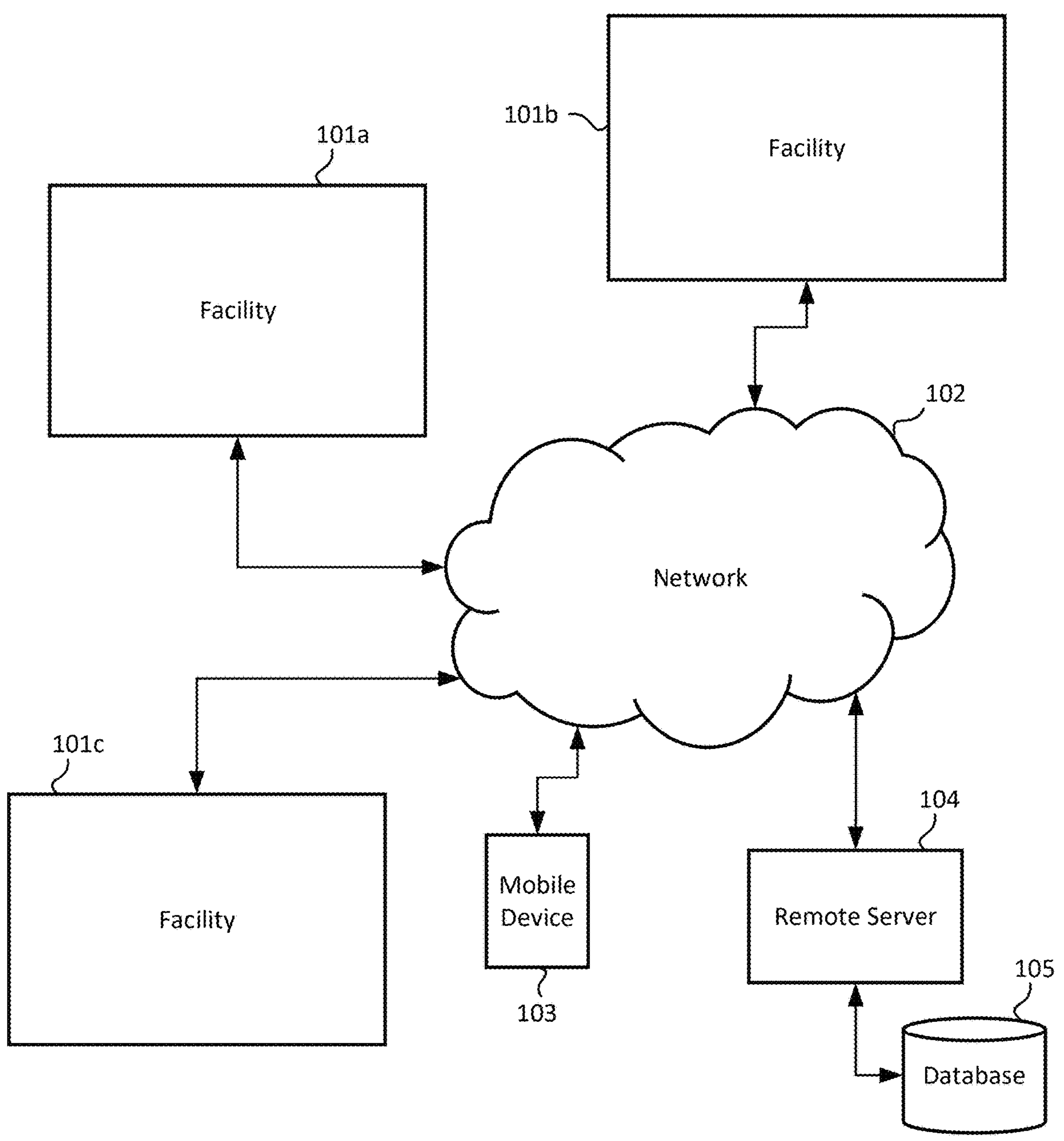
FIG. 1 depicts an example environment in which one or more aspects of the disclosure may be practiced.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for checking whether a mobile device involved in an electronic transaction is in a particular physical location throughout the transaction, or at least during one or more portions of the transaction. Aspects may further relate to methods and techniques for performing the transaction in a particular way depending upon whether the mobile device is determined to be at a particular location. For example, if the mobile device is determined to be at the particular location during one or more portions of the transaction, the transaction may be performed in a first way or a first variation of the transaction may be performed. If the mobile device is alternatively not determined to be at the particular location during one or more of the portions of the transaction, the transaction may be performed in a second way (different from the first way) or a second variation (different from the first variation) of the transaction may be performed. The type of transaction to be performed may be any type of transaction, such as user authentication, authenticating a user for physical access to a secured location, as a precursor to accessing confidential data, a financial transaction, and the like.

Further aspects discussed herein may relate to methods and techniques for determining that the mobile device is at a particular location based on determining whether the mobile device is able to authenticate a tag received by the mobile device, wherein the tag is available to the mobile device at the physical location. For example, the tag may be an optically-readable(e.g., electronically displayed) object, such as a quick-response (QR) code or bar code, that may be unique to the location (and that may identify the location). Furthermore, the tag may be available for a limited amount of time. For example, the displayed tag may be displayed for only a predetermined period of time before being replaced with another displayed tag associated with that location. Thus, the determination of the mobile device's location may be a determination that the mobile device is present at the particular location within a particular timeframe.

As discussed further herein, combinations of these and other features may allow for a transaction to be conducted in a particular way (or even may be allowed to continue or be denied) based on whether the mobile device is in a particular location during one or more portions of the transaction. In this way, the transaction may involve one or more time-location "checkpoints" to verify that the mobile device is (or remains) in the expected location during at least some of the transaction. This may be useful for transactions that would be inappropriate to conduct where the mobile device is elsewhere. For example, if confidential data is to be viewed via the mobile device, it may be desired that the confidential data is accessible to the mobile device only while the mobile device is in a predetermined (e.g., secured) location. As another example, a user of the mobile device may be granted secured entry to a physical location only if the mobile device is detected to be present at or near the physical location via one or more time-location checkpoints. As yet another example, a financial transaction may be appropriate only when the user is deemed to be present in a physical location associated with the financial transaction, such as at a point of sale location, a warehouse, or a retail banking center.

FIG. 1 illustrates an example environment in which various features described herein may be performed. The environment may include one or more facilities 101 (e.g., facility 101*a*, facility 101*b*, and/or facility 101*c*). Each of the facilities 101 may be in a different geographic location (for example, located in a different city, state, or country, or on a different block of the same city), and may be comprised of a structure such as a building (or portion thereof such as a room) containing one or more computing devices. Each facility may be, for example, a commercial retail store, a supermarket, a bank, a drive-through service location, an office, a home, an apartment, a townhouse, a tent, an outdoor marketplace, a physical security checkpoint, and/or any other type of location generally having discrete or otherwise recognized boundaries. However, these are only examples—a facility may be any defined location or area as desired.

As mentioned above, each facility 101 may have one or more computing devices, which will be discussed in greater detail below by way of example, and any of these computing devices may be communicatively connected to a network 102. Network 102 may include any one or more physical and/or logical networks suitable for communicating electronic information, including wireless (e.g., cellular telephone/data or wi-fi) networks and/or wired (e.g., Ethernet, landline telephone/data, cable, optical fiber, etc.,) networks in any combination. Moreover, network 102 may be a private or public network and may be connected to or form part of an intranet or the Internet. Each of the facilities 101 may have one or more computing devices that may each have a unique network address, such as a unique Internet Protocol (IP) address.

One or more devices, such as remote server 104, database 105, and/or other computing devices, may also be communicatively connected to network 102.

The environment may also include or more mobile devices, such as mobile device 103, which may allow a user of the mobile device to interact with one or more of the computing devices located at the facilities 101 and/or with remote server 104 and/or database 105, as will be described in detail below. Mobile device 103 may be any type of mobile device, such as but not limited to a cellular phone (e.g., a smart phone), tablet computer, laptop computer, or a smart watch or other wearable accessory.

Any of the facilities 101, computing devices of those facilities, mobile device 103, remote server 104, and/or database 105 may be configured to communicate with one another directly and/or via network 102. As will be discussed by way of example below, a user of mobile device 103 may enter one of the facilities 101, read a tag presented by a computing device of the facility, and using that tag, conduct an electronic transaction that may involve one or more of the computing devices in the facility, remote server 104, and/or database 105.

Figure 2:
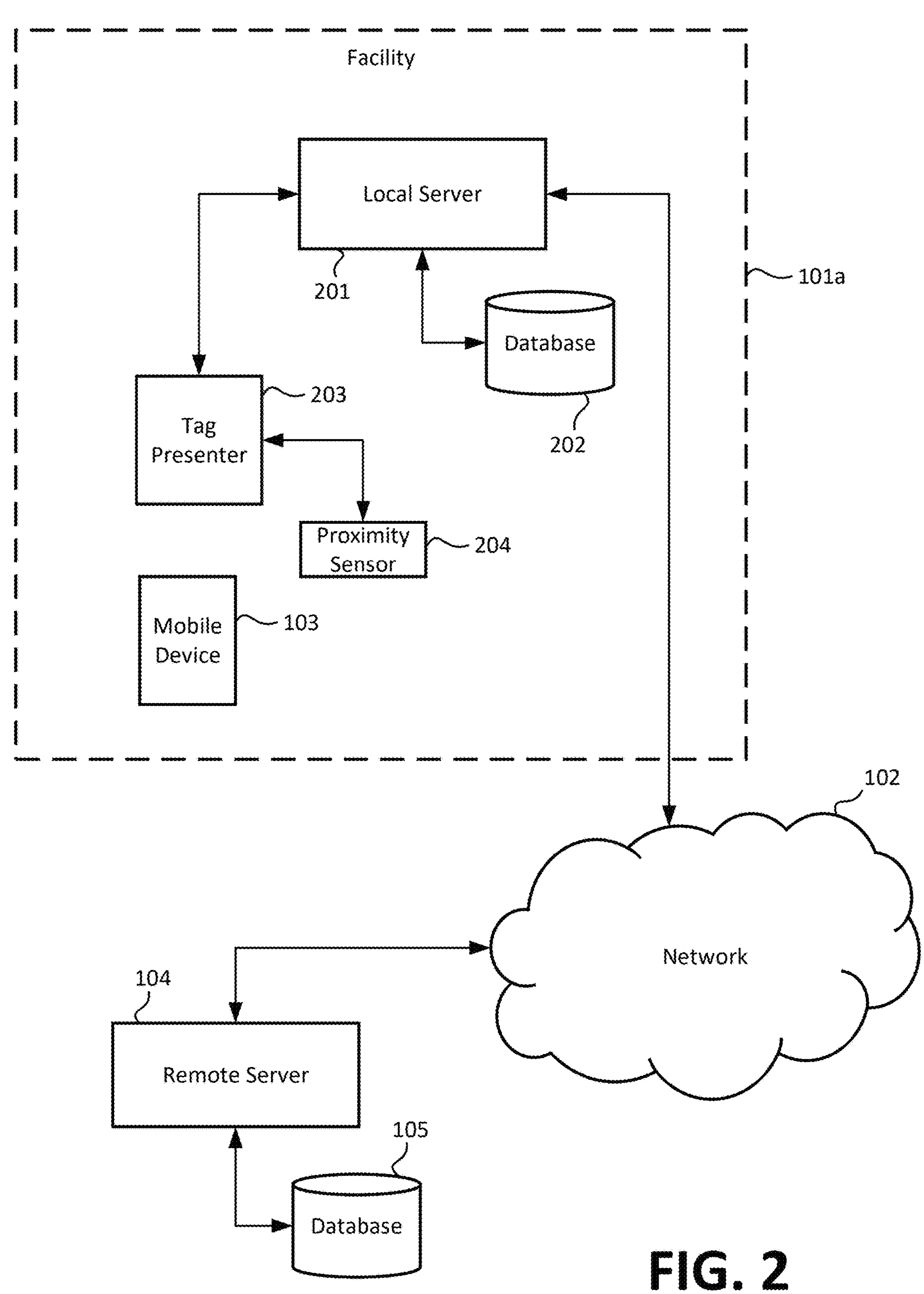
FIG. 2 depicts additional details of the example environment of FIG. 1.

As explained above, each of the facilities 101 may include one or more computing devices. For example, where one of the facilities 101 is a retail store or a bank, each of the one or more computing devices may be located within the same room or building in which the retail store or bank is located. FIG. 2 illustrates an example of certain computing devices that may be part of facility 101*a*. While facility 101*a* is specifically shown in FIG. 2, it will be understood that the other facilities 101*b* and 101*c* may be configured in the same way, a similar way, or differently than facility 101*a*.

In the illustrated example, facility 101*a* includes one or more local servers (such as local server 201), one or more databases (such as database 202), and one or more tag presenters (such as tag presented 203). Local server 201 and/or remote server 104 may be configured via software and/or hardware to generate tags for display via tag presenter 203. The tags may be displayed in any form desired, such as but not limited to quick-response (QR) codes, bar codes, other graphical shapes, alphanumeric characters, and/or pictures. Each tag may be generated in real-time for display, or may be pre-generated and stored for retrieval at a desired time of display. Each tag may be unique from another tag, and may be generated based at least in part on an identity of the facility in which the tag is to be displayed, a time of day (e.g., the time of day during which the tag is to be displayed or is generated), and/or any other information such as a seed (e.g., a random or pseudorandom seed). For example, one or more of these items of information may be used to generate a token in the form of data. This token may be encoded by the tag such that the token is discernable by reading the tag.

Each tag may be time-limited, in that each tag may be displayed via tag presenter 203 for, and/or valid for, a particular amount of time. For example, each tag may be valid (and displayed) for a time period that is ten seconds or less, or that is thirty seconds or less, or that is one minute or less, or that is five minutes or less. Once the tag has expired, a new tag valid for the next time period (e.g., the next ten second or less, thirty seconds or less, etc.) may be displayed in place of the previously expired tag.

Figure 6:
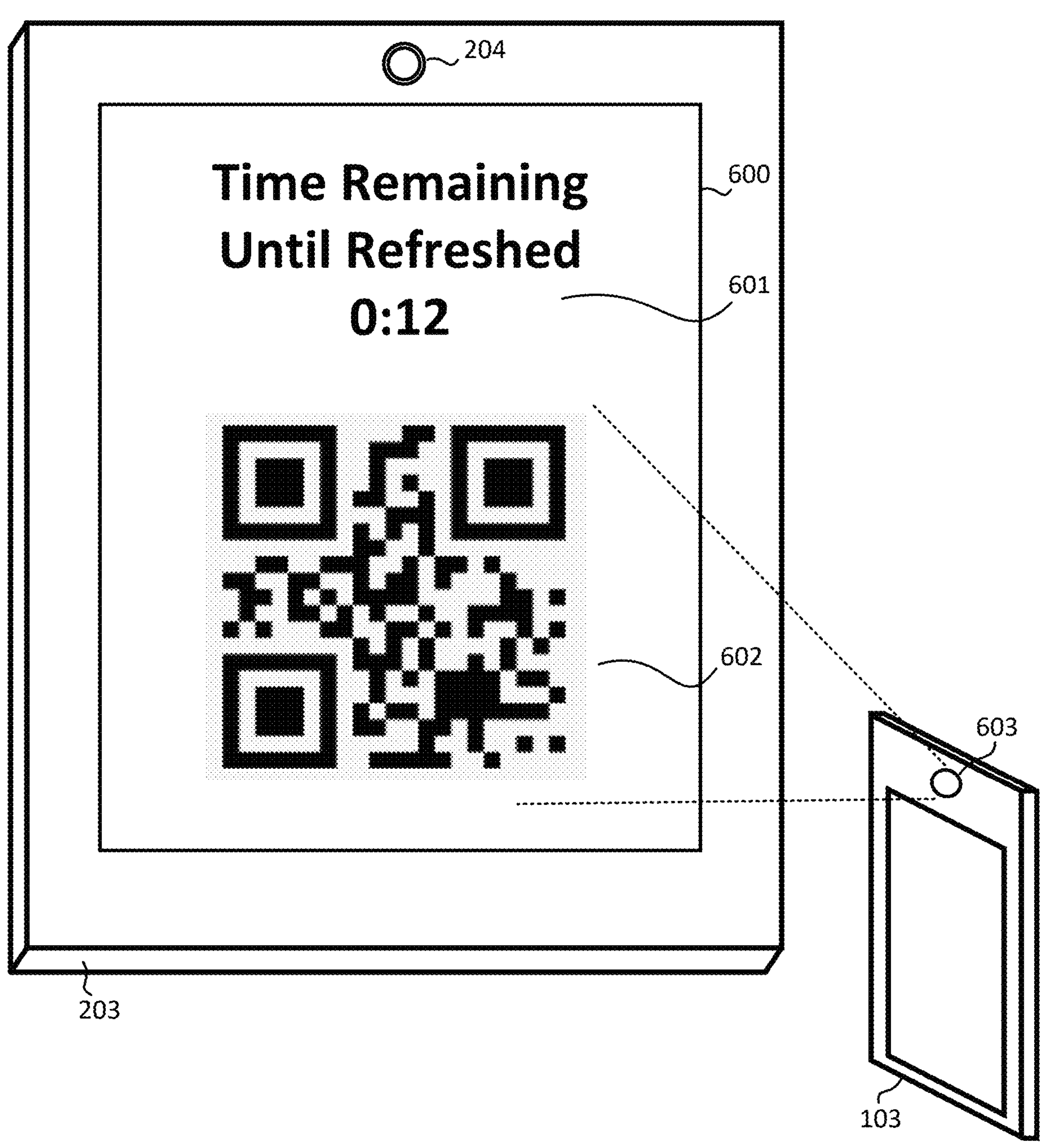
FIG. 6 depicts an example interaction between a mobile device and a tag presenter, including an example display of content by the tag presenter.

Tag presenter 203 may be, or otherwise include, a display device such as an LCD display screen, LED display screen, television screen, computer screen, and/or the like. Tag presenter 203 may also be or otherwise include a computing device configured by hardware and/or software to drive the display device. Non-limiting examples of tag presenter 203 include a tablet computer (e.g., an Apple iPad) such as shown in FIG. 6, a laptop computer, a desktop computer, a television, a projector, and/or any other device that includes a means for displaying the tag such that the tag is optically readable by a camera of mobile device 103.

Tag presenter 203 may also be connected to, include, or otherwise be in communication with, a proximity sensor 204. Proximity sensor 204 may be configured to detect that a person and/or mobile device is near tag presenter 203. Non-limiting examples of proximity sensor 204 include a motion detector, an infrared sensor, a near-field sensor, a camera (such as shown in FIG. 6 as part of tag presenter 203 implemented as a tablet computer), a laser-based sensor, or a floor pressure sensor located near tag presenter 203. Proximity sensor 204 may be a device separate from tag presenter 203 or be integrated with tag presenter 203. For example, where tag presenter 203 is a tablet computer or laptop computer, the camera usually integrated with such devices may serve as proximity sensor 204. Proximity sensor 204 may be configured, via hardware and/or software, to determine whether a person or mobile device (or any other object depending on the type of proximity sensor) is proximate to tag presenter 203, and may be configured to detect proximity when the object is within a certain range of proximity sensor 204 and/or tag presenter 203, such as within five feet or less, or within ten feet or less, or any other distance as desired.

As will be explained below, a user may enter facility 101*a* with mobile device 103, which may include a camera. Tag presenter 203 may display a tag. The displaying of the tag may be performed (e.g., constantly displayed) regardless of the user's presence, or may be performed in response to proximity sensor 204 detecting presence of an object such as the user or mobile device 103. The camera of mobile device 103 may be used to optically read the tag currently being displayed by tag presenter 103. The token and/or other information encoded by the displayed tag may be used by mobile device 103, local server 201, and/or remote server 104 to conduct an electronic transaction that may involve mobile device 103, local server 201, and/or remote server 104. For example, the token may be used to authenticate whether the transaction may be performed, to determine which variation of the transaction is to be performed, to determine whether mobile device 103 is properly configured to be involved in the transaction (e.g., whether mobile device 103 is loaded with appropriate software needed for the transaction, and/or to verify that mobile device 103 (and thus the user of mobile device 103) is physically present at facility 101*a*.

Such physical presence may be a prerequisite to performing the transaction or a particular variation thereof. For example, if physical presence is verified, the transaction may be performed in accordance with a first variation. If physical presence is not verified, the transaction may be denied or it may be performed in accordance with a second variation. As a more specific example, a point-of-sale transaction to purchase goods or services, or a banking transaction such as to open or close a banking account or withdraw money from an existing banking account, may be allowed to proceed only if it is verified (via mobile device 103 reading the displayed tag) that mobile device 103 is physically present at facility 101*a* just prior to or during the transaction. Or, for example, if physical presence is not verified yet a customer wishes to open a new banking (e.g., checking or savings) account via a user interface presented by the user's mobile device 103, the account opening process presented to the user may proceed in accordance with a first set of regulatory requirements and/or a first risk policy. However, if physical presence of the user is verified by mobile device 103 reading the tag and reporting the information encoded by the tag, the account opening process may be allowed to proceed in accordance with a second (less stringent) set of regulatory requirements and/or a second (less stringent) risk policy. Using such time-limited tags to verify physical presence may be more convenient for both the customer and the service provider, as opposed to, for example, the customer being required to interact with a human service provider to verify the customer's physical presence. Such convenience may be realized in that, for example, the customer may not need to wait in line to interact with a human to verify physical presence, and that the facility 101*a* may need to employ fewer people to perform physical presence verification. In addition to convenience, such tag-based physical presence verification may assist the service provider and/or seller (e.g., the party in control of facility 101*a*) satisfy any regulatory requirements that may be imposed on the electronic transaction. For example, in the situation where the electronic transaction is the opening of a new banking account for a new customer physically present at a banking branch location, government regulations may provide a basic requirement to allow the customer to open a bank account under less stringent risk guidelines.

Causing each displayed tag to be valid for only a limited timeframe may prevent tag sharing or another type of work-around. For example, if the tag being read is valid for only a fifteen second timeframe before being replaced with the next tag that is valid for the next fifteen second timeframe, it would be difficult for a user of mobile device 103 to share the tag with another user that is not physically present at facility 101*a*, such that the tag could be used by the other user for an electronic transaction while the tag remains valid. The likelihood of this happening successfully could be reduced by shortening the timeframe. However, a timeframe that is extremely short (e.g., one second), while still possible and still within the scope of the present disclosure, may prove to be inconvenient to the customer in certain situations and for certain electronic transactions.

Figure 3:
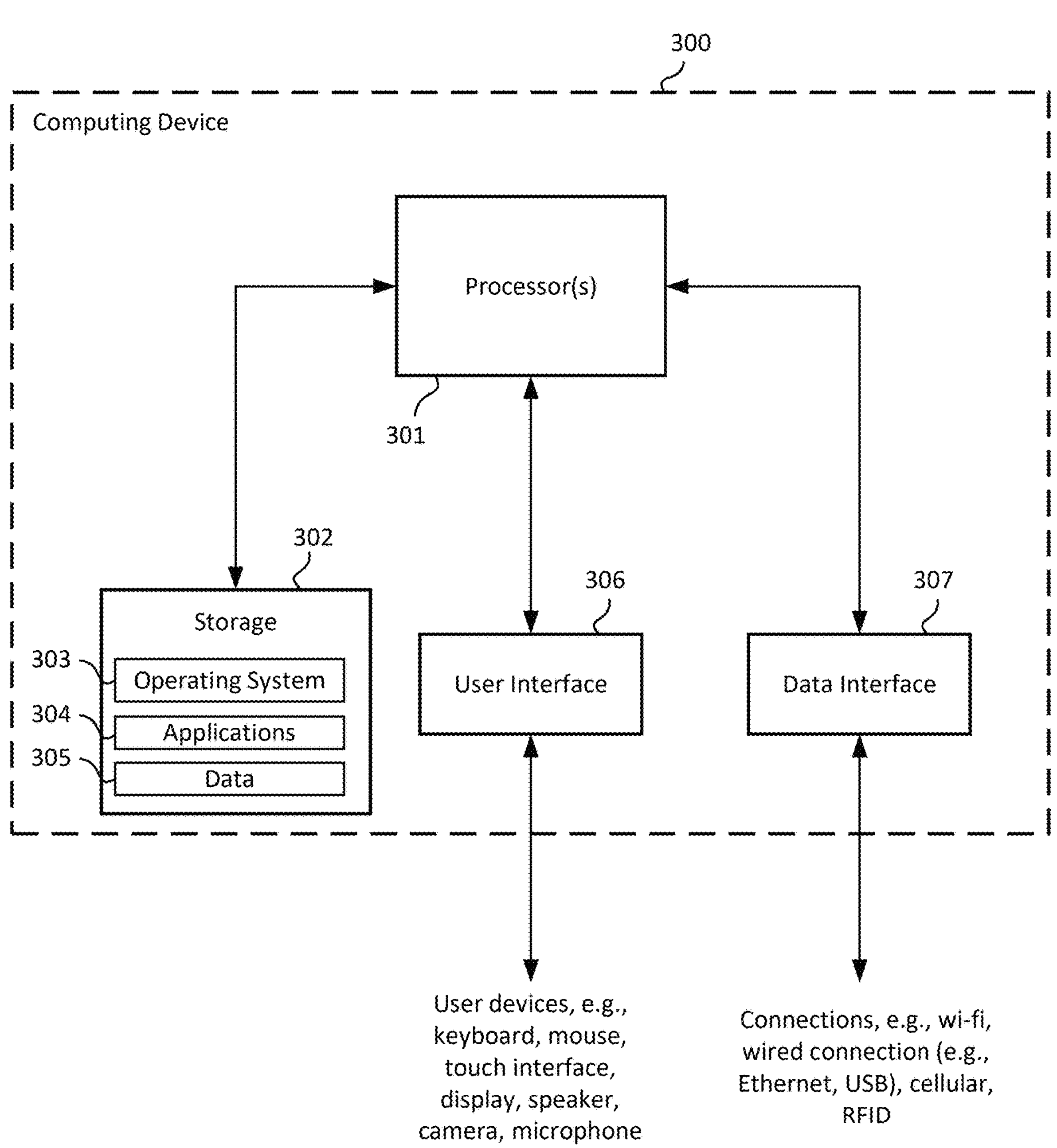
FIG. 3 depicts an example of a computing device that may be used in implementing one or more aspects of the disclosure in accordance with one or more illustrative aspects discussed herein.

Any of the devices discussed herein, including but not limited to elements 103, 104, 105, 201, 202, 203, and 204 in FIGS. 1 and 2, may be implemented partially or completely as a computing device. An example of a computing device 300 is illustrated in FIG. 3. Computing device 300 may implement one or more aspects of the disclosure by reading and/or executing stored instructions, and by performing one or more actions based on the instructions. Computing device 300 may represent, be incorporated in, and/or include one or more various devices such as one or more desktop computers, one or more computer servers, one or more mobile devices (e.g., a laptop computer, a tablet computer, a smart phone, any other type of mobile computing device, and the like), and/or any other types of data processing devices. Computing device 300 may operate in a standalone environment or in a networked environment, and may operate as a single physical device or as multiple distributed devices operating in parallel manner or in a pipeline processing manner.

Computing device 300 may include, by way of example, one or more processors 301, storage 302, a user interface 306, and a data interface 307. The one or more processors 301 may include, for example, one or more computer processing units (CPUs), graphical processing units (GPUs), and/or other processing units such as a processor adapted to perform computations associated with machine learning.

Storage 302 may store computer-readable information, such as software (in the form of instructions executable by the one or more processors 301) for configuring computing device 300 into a special-purpose computing device in order to perform one or more of the various functions discussed herein. The software may include operating system software 303 and/or one or more software applications for controlling operation of computing device 300 to perform the functionalities discussed herein. Storage 302 may further store non-executable data that may be used by the operating system 303 and/or the software applications 304. The data 305 may be organized as part of a database, file system, or in another manner as desired.

User interface 306 may include hardware (e.g., circuitry) and/or software for sending and/or receiving information to and/or from one or more external user devices, such as one or more keyboards, mice, touch interfaces, displays, speakers, cameras, and/or microphones. User interface 306 may be at least partially implemented by the one or more processors 301 and/or storage 302, and/or may include separate hardware and/or software for performing its functionality.

Data interface 307 may include hardware (e.g., circuitry) and/or software for reading, writing, displaying, and/or printing data or files, and/or for communicating with external devices and/or networks. For example, computing device 300 may communicate with one or more external devices via, e.g., a wireless connection such as wi-fi, cellular, or RFID communications, or a wired connection such as Ethernet or USB. The one or more external devices may be, for example, other computing devices, such as servers, personal computers, or mobile devices, networks, or printers. I/O 119 may be coupled with a display such as display 120. For example, data interface 307 may allow computing device 300 (e.g., local server 201) to communicate with another electronic device (e.g., remote server 104) via network 102. Data interface 306 may be at least partially implemented by the one or more processors 301 and/or storage 302, and/or may include separate hardware and/or software for performing its functionality.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 4:
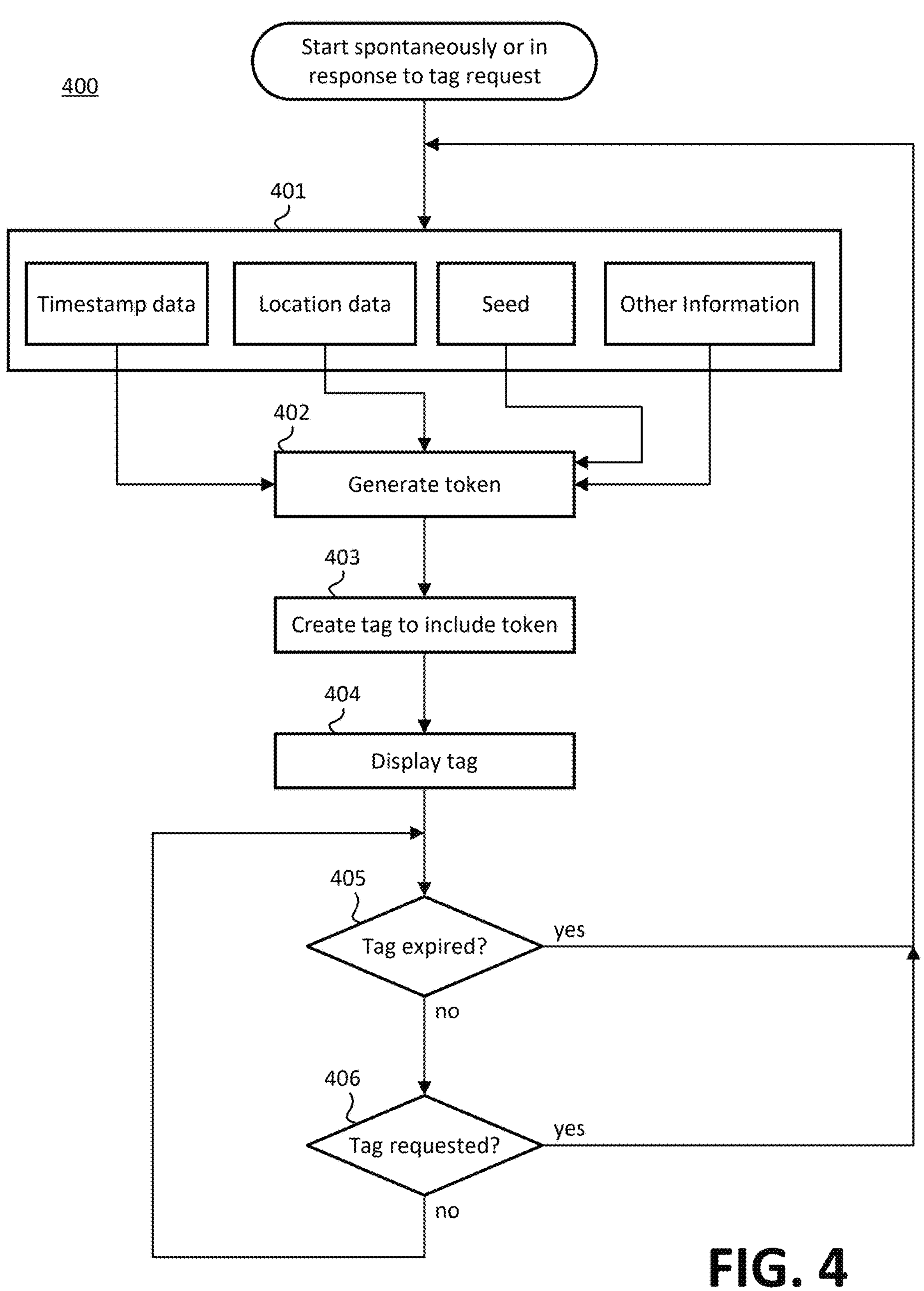
FIG. 4 depicts a flow chart for an example method for generating and presenting one or more tags.

FIG. 4 illustrates an example method 400 for generating time-limited tags for display in accordance with one or more aspects described herein. Method 400 may be implemented by one or more computing devices, as described further herein. For example, method 400 may be implemented by any suitable computing environment by a computing device and/or combination of computing devices, such as computing devices 104, 105, 201, 202, 203, and/or 204 of FIGS. 1 and 2. Method 400 may be implemented in suitable program instructions, such as operating system 303 and/or one or more software applications 304, and may operate using suitable data, such as data 305 (which may be stored at, e.g., databases 105 and/or 102).

Method 400 may begin spontaneously (for example, upon initial execution of a software program) or in response to an event such as the receipt of a request for a tag. For example, the user of mobile device 103 may cause mobile device 103 (e.g., via a user interface) to send a request to local server 201 for a tag to be presented. The user may manually make the request via mobile device 103 after, for example, entering facility 101*a*. Alternatively, the request may be sent in response to proximity sensor 204 detecting an object (e.g., the user and/or mobile device 103), such as detecting whether the object is within a proximate range of proximity sensor 204 and/or tag presenter 203.

At step 401, which, again, may be performed spontaneously or in response to a request for a tag, various types of data may be determined that may be used as a basis for generating the tag. Such data may include, for instance, timestamp data (based on, e.g., the current time of day and/or date) may be determined. As an example, if the current time and date is 4:16 pm on Jan. 3, 2019, then the timestamp may include data in any format such as time:date (e.g., 1616:01032019).

The data used as the basis for generating the tag may additionally or alternatively include location data. The location data may be indicative of a geographic location, or indicative of a particular one of facilities 101. As an example, the location data may indicate a street address of facility 101*a*, or an arbitrary name or other identifier of facility 101*a* (e.g., "1" representing the first facility in a group of facilities, "2" representing the second facility, etc.).

The data used as the basis for generating the tag may additionally or alternatively include a seed. The seed may be any arbitrary value or set of values as desired. As an example, the seed may be the next value in a predetermined set of values, a pseudo randomly or randomly determined value, and/or any other value(s) that may be generally considered unpredictable by the user of mobile device 103. One reason a seed may be used is that it may make it difficult to spoof the tag, because the information encoded in the tag may be unpredictable by the user of mobile device 103. If, for example, the tag were based only on the location and time of day, it is more likely that a user might be able to figure out the information encoded in the next tag during the next time frame, and be able to provide this information during an electronic transaction without necessarily having read any tag displayed by tag presenter 203 (and without necessarily being present at facility 101*a*).

The data used as the basis for generating the tag may additionally or alternatively include other information. Such other information may include, for example information associated with the electronic transaction to be performed. For example, the information may identify the type of electronic transaction to be performed, a website or server through which the transaction is to be conducted, and/or identify a software application and/or configuration information to be executed by mobile device 103 for conducting the transaction and/or for configuring mobile device 103 to be able to conduct the transaction. The other information may also include, for example, an indication of the valid time period or expiration time of the tag, an identifier of which tag presenter 203 is presenting the tag, and/or an identifier for the electronic transaction that is in progress, which may provide an employee/agent at the facility information used to decide whether to cancel the electronic transaction if the employee/agent determines that the electronic transaction involves, e.g., fraudulent activity or abuse of the electronic transaction system.

At step 402, any of the information collected, generated, or otherwise determined in step 401 may be used to generate a token. The token thus may be generated or otherwise determined based on the information determined in step 401. For example, the token may be a concatenation of the timestamp data, the location data, and/or the seed, such as with each piece of information being placed in series with another piece of information (e.g., timestamp:location:seed); or a value that is generated using a mathematical algorithm with the pieces of information from step 401 being used as inputs to the mathematical algorithm (e.g., scrambling the timestamp data and/or the location data using the seed); or any other value or set of values that are based on the information from step 401. The token may have one or more values that are presented using any information symbols desired, such as binary, numeric, alphanumeric, graphical, color-coded symbols, and the like.

At step 403, a tag may be created that includes the token and/or directly includes the information gathered during step 401. For example, the tag may include a visual representation of the token and/or the information, in which the tag may be visually readable by a computer via a camera and/or by a human directly. Any of the information discussed with respect to step 401 may be encoded as part of the token, and/or encoded in the tag separately from the token. In further examples, a token is not created based on a combination of any of the information from step 401, and instead each item of information from step 401 may be encoded separately into the tag.

At step 404, the tag may be sent to tag presenter 203 (where the tag is generated remotely from tag presenter 203) for display via its display device. An example of this is shown in FIG. 6, which shows a tag 602 in the form of a QR-code that visually indicates a token as a set of graphical bars in two dimensions. Tag 602 may be displayed via a display device (e.g., on a display screen) 600 of tag presenter 203, and may be readable by a camera 603 of mobile device 103. Other examples may include a tag in which the token is displayed as a series of symbols such as alphanumeric characters, numbers, or other symbols.

In addition to displaying the tag itself, step 404 may also include displaying an indication of the time remaining for the displayed tag. An example of this is shown in FIG. 6, in which an indication 601 states "Time Remaining Until Refreshed" followed by an indication of twelve seconds remaining. The indication of how long a time period is remaining until refresh of the tag (or another event such as the tag disappears) may be updated in real time and/or periodically. For example, the indication of time remaining may be updated once per second. As an example, if the predetermined amount of time each tag is valid is thirty seconds, then the indication of time remaining may begin at thirty seconds and count down each second until the end of that time period. The particular layout of the displayed content in FIG. 6 is merely an example, and other layouts may be used. For example, the tag may be displayed above or beside the time remaining, or the time remaining may be presented in analog clock form, or as a progress bar that shortens or lengthens as the time period progresses, or as a color indication that changes as the time period progresses (e.g., a traffic light that starts green, then switches to yellow as the time is nearly up, and then moves to red just prior to the time period being up or when the tag is no longer valid and needs to be replaced), or in any other form. In other examples, no time remaining indication may be displayed or otherwise provided to the user, thereby potentially making it more difficult for the user to attempt to bypass the system such as by providing the tag information to another user that is not physically present at the facility.

As discussed previously, the tag may be displayed and/or valid for only a predetermined period of time, after which point a new tag would replace the current tag. One way to implement this is by performing steps 405-406. At step 405, it may be determined whether the tag is expired. For example, a timer may be reset when each new tag is presented for display, and when the timer reaches a predetermined value, the tag may be considered expired. Or, the tag may have a timestamp associated with it (e.g., the timestamp data discussed with respect to step 401), and the timestamp for the tag may be compared with a current time. If a difference between the current time is equal to or greater than the predetermined time period (e.g., if the difference is equal to or greater than a threshold amount of time), then the tag may be considered expired.

If the tag is considered expired at step 405, then the method may move back to step 401 to create a new tag. In other examples, the new tag may be created prior to expiration of the current tag, but withheld from being displayed at step 404 until the current tag has expired. In that case, the method may instead move back to step 404. Moreover, where the new tag has already been created, the new tag may have been stored in storage such as database 105 and/or 202, and may be retrieved from such storage at step 404.

If the tag is not considered expired at step 405, then the process may move on to step 406. At step 406, it may be determined whether a new tag has been requested. For example, tag presenter 203, proximity sensor 204, and/or mobile device 103 may send a request to local server 201 and/or remote server 104 for a new tag. Such a request may occur before the current tag expires, or regardless of whether a current tag is being displayed. If a new tag is requested, then the method may move back to step 401 to create a new tag. Alternatively, if the new tag was already created (and stored in, for example, database 105 and/or 202), then the method may move back to step 404 to retrieve the pre-stored tag for display.

Thus, method 400 may be performed to create and display new tags on a periodic basis. Method 400 may be repeated in a loop for as long as desired, and may be performed in parallel with method 500 of FIG. 5, discussed below.

FIG. 5 illustrates an example method 500 for implementing an electronic transaction using one or more of the tags that are displayed using method 400, in accordance with one or more aspects described herein. Method 500 may be implemented by one or more computing devices, as described further herein. For example, method 500 may be implemented by any suitable computing environment by a computing device and/or combination of computing devices, such as computing devices 104, 105, 201, 202, 203, and/or 204 of FIGS. 1 and 2. Method 500 may be implemented in suitable program instructions, such as operating system 303 and/or one or more software applications 304, and may operate using suitable data, such as data 305 (which may be stored at, e.g., databases 105 and/or 102).

At step 501, a user of mobile device 103 may enter (e.g., walk into or drive through) one of the facilities 101. By way of example, it will be assumed for the remainder of method 500 that the user has entered facility 101*a*.

The user may approach tag presenter 203 with mobile device 103. If proximity sensor 204 is used, proximity sensor 204 may detect the presence of the user and/or of mobile device 103, and in response, cause a tag (e.g., tag 602) to be displayed by tag presenter 203. Alternatively, tag presenter 203 may always be displaying a tag regardless of the user's presence.

At step 502, the user may use camera 603 of mobile device 103 to read the tag (e.g., tag 602) currently displayed by tag presenter 203. This is shown by way of example in FIG. 6.

At step 503, mobile device 103 may interpret the tag to determine the token and/or any other information encoded by the tag. This interpretation may be performed by the operating system of mobile device 103 and/or using a software application executed by mobile device 103. Where the tag includes information identifying a website, server, or other network location, mobile device 103 may automatically (or request the user's permission to) browse to the identified website and/or initiate a connection with the server or other network location. In some examples, the identified website may be a website implemented/served by remote server 104.

Where the tag includes information identifying a particular software application, mobile device 103 may attempt to execute the software application, assuming that the software application is already loaded onto mobile device 103. Thus, at step 503 it is determined whether mobile device 103 has the identified software application. If so, then the method moves to step 506. If it does not have the identified software application, then the method moves to step 504. Where the tag includes information identifying particular configuration information, mobile device 103 may configure itself in accordance with that information and/or download the configuration information from a remote source (e.g., from local server 201 and/or remote server 104), and then configure itself in accordance with the configuration information.

At step 504, mobile device 103 may attempt to load the identified software application, such as via network 102 (e.g., via the Internet). In this case, the information identifying the software application may additionally identify a network location from where the software application may be downloaded. Depending upon how mobile device 103 is configured, the loading may be performed automatically directly in response to determining the identified software application. Alternatively, mobile device 103 may present a user interface requesting the user for permission to load the software application. Either way, at step 505, mobile device 103 may load the application, such as to local storage of mobile device 103. If the application is not successfully loaded (e.g., if the user denies permission), then method 500 may be ended.

Once the software application is loaded (or if the software application was already determined to be loaded at step 503), then the method may move to step 506. At step 506, mobile device may initiate executing the software application. At step 507, the software application executed by mobile device 103 may present (e.g., display) one or more user interfaces to the user, and may communicate with one or more other devices (e.g., local server 201 and/or remote server 104) to perform the electronic transaction. For example, if the transaction is to open a new bank account, the user may be presented with a user interface requesting information pertinent to opening the bank account, such as the user's name, contact information, social security number, and the like. The software application may transmit the information collected via the user interface to one or more other devices (e.g., local server 201 and/or remote server 104) to begin opening the bank account.

At one or more points during the electronic transaction, and after the tag was initially read in step 502, the software application may request that the user use mobile device 103 to read another tag from tag presenter 203. For example, the software application may request this after a particular predetermined step in the electronic transaction has been reached, after a certain type of information has been requested or entered by the user during the electronic transaction, after the user has not interacted with the user interface for at least a timeout period, and/or after a predetermined period of time has passed since the last tag was read or since the electronic transaction was initiated. Non-limiting examples of the predetermined period of time include periods of time that are one minute or less, or five minutes or less, or ten minutes or less, or more than ten minutes. If these or any other factors take place, then it may be determined at step 508 that an additional tag needs to be read via the camera of mobile device 103, and so at step 509 the software application may prompt the user (e.g., via the user interface) to read another tag. If it has not been determined that an additional tag is needed, then the process may continue with step 507 (user interacting with the software application) until such time that an additional tag is determined to be needed.

One reason that one or more additional tags may be requested is to confirm that the user is remaining at facility 101*a* during the electronic transaction. One way to determine this is by implementing steps 510-513. At step 510, mobile device 509 may read the next tag and send the information read from the tag to another one or more devices (e.g., local server 201 and/or remote server 104), similar to step 502. Then, it is determined (e.g., by local server 201 and/or remote server 104) based on this information whether the next tag is at the same facility (in this example, facility 101*a*) as the first tag or previous tag that was read during the electronic transaction.

If this next tag indicates the same facility, then the method moves to step 511. If this next tag indicates a different facility (of if another tag is not read at all, which may be the case if the user is no longer in any of the facilities), then the method moves to step 512, which may abort, end, or restart method 500. Alternatively, the user may be given one or more chances to read the next tag before aborting, ending or restarting.

At step 511, if the next tag was read within the predetermined time period of the previous tag, or within a predetermined time period from when the software application requested that this next tag be read, then the method moves to step 513. Otherwise, the method moves to previously-discussed step 512.

At step 513, it may be determined that the subsequent tag reading is successful, and in response it may be determined (e.g., by mobile device 103, local server 201, and/or remote server 104) that the electronic transaction is to continue, such as by moving back to step 507. Alternatively, it may be determined that the electronic transaction was successful and can now end. A message may be sent (e.g., by local server 201 and/or remote server 104) to mobile device 103 indicating that the electronic transaction has ended. The message may include instructions as to next steps in the overall transaction, such as to approach a human service provider at facility 101*a*. Mobile device 103 may generate a user interface, based on the message, indicating to the user that the electronic transaction has ended and notifying the user of the next steps, if any.

The electronic transaction may or may not result in a fully completed transaction (e.g., result in a bank account being opened), and may instead allow for at least some initial steps toward the full transaction to be performed. The full transaction may be completed after the electronic transaction is performed and ended, such as by following up with an interaction with a human service provider located at facility 101*a*, via a telephone call, via email, via physical mail, and/or via any other form of communication with the user.

Figure 7:
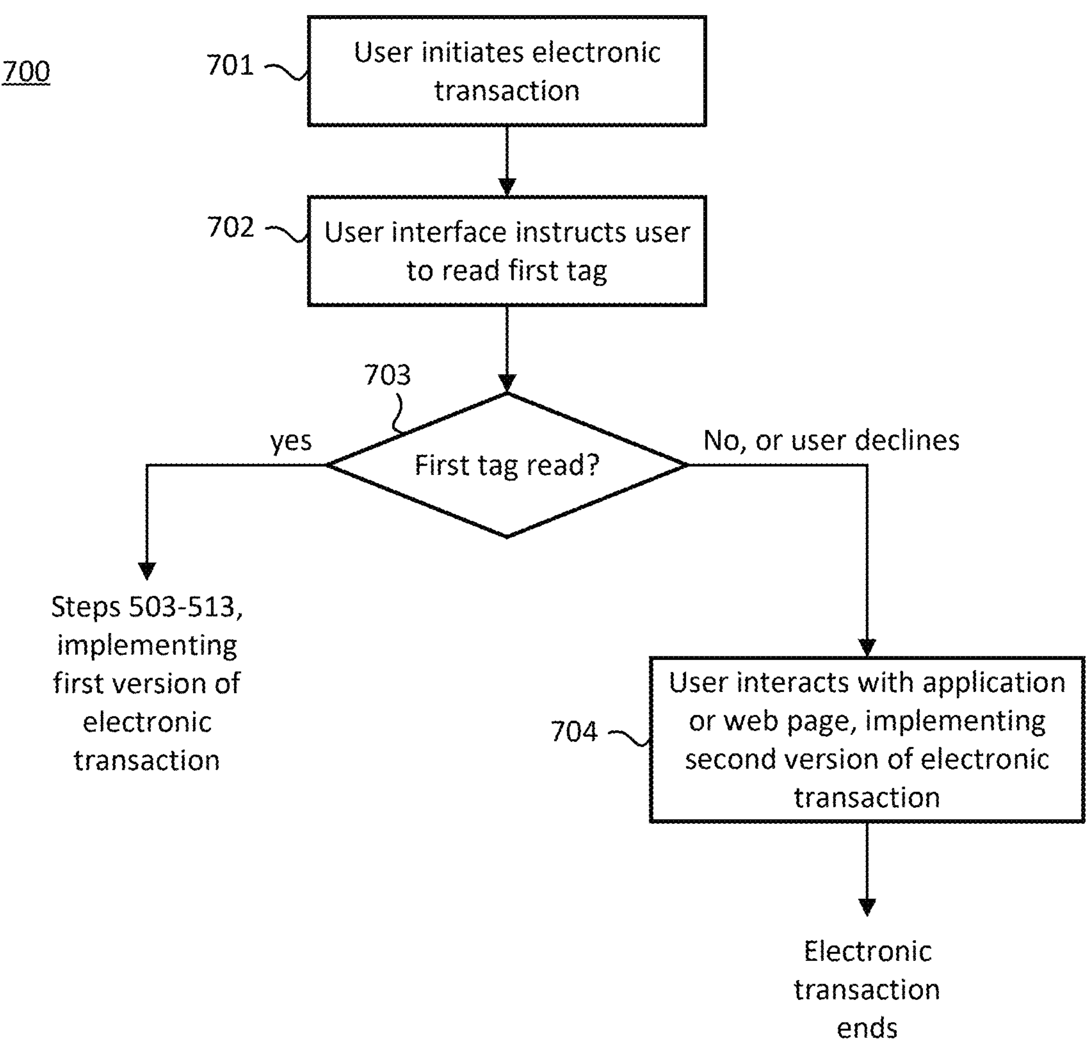
FIG. 7 depicts a flow chart for an example method for implementing an electronic transaction in different ways depending upon whether a tag is read.

Variations of method 500 are within the scope of this disclosure. For example, rather than initiating the electronic transaction in response to mobile device 103 reading the first tag (at step 502), the electronic transaction may be initiated in response to mobile device 103 browsing to a particular web page for conducting the electronic transaction, or in response to mobile device 103 executing particular software application for conducting the electronic transaction. An example of this is shown as method 700 in FIG. 7. In this variation of the method, at step 701, the user may initiate the electronic transaction by browsing to the specific web page or executing the specific software application. At step 702, the web page interface or software application may present a user interface, via mobile device 103, that instructs the user to read a tag from tag presenter 203. The user may do so if the user is physically present at facility 101*a* (the "yes" branch from decision step 703), and then the method may continue as previously described starting at step 503, and using a first version of the electronic transaction. If the user has initiated the electronic transaction via the software application, then steps 503-506 may be skipped. Following the "no" branch from decision step 703, if the user is unable to read the tag, or if the user declines to such as by selecting an option from the user interface to proceed without reading the tag, then at step 704, the electronic transaction may be conducted as before, except a second version of the electronic transaction (different from the first version) may be conducted. The second version of the electronic transaction may, for example, require additional steps or request additional information from the user as compared with the first version of the electronic transaction. Once the electronic transaction has ended, mobile device 103 may receive a message from, e.g., local server 201 and/or remote server 104 indicating that the electronic transaction has ended. The message may include instructions as to next steps in the overall transaction, such as to approach a human service provider at facility 101*a*. Mobile device 103 may generate a user interface, based on the message, indicating to the user that the electronic transaction has ended and notifying the user of the next steps, if any.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

generating, by a computing device, a first optically-readable code that indicates a transaction, a first location, and first time information;

based on a first message, received from another device that has read the first optically-readable code, authenticating the transaction and performing a first portion of the transaction;

generating a second optically-readable code that indicates a second location and second time information;

based on a second message received from another device that has read the second optically-readable code:

determining whether the second location matches the first location; and determining, based on the first time information and the second time information, a time difference; and based on a determination that the second location matches the first location and a determination that the time difference satisfies a timeframe criterion, sending a third message associated with a second portion of the transaction.

2. The method of claim 1, wherein the time difference satisfies the timeframe criterion by being less than a threshold amount of time.

3. The method of claim 1, wherein the first optically-readable code comprises an optically-readable token that is generated based on the first location, a first time, and seed information, wherein the first message comprises token information that is based on the optically-readable token, and wherein the method further comprises determining the first location and the first time based on the token information.

4. The method of claim 1, wherein the first optically-readable code comprises an optically-readable token, wherein the first message comprises token information that is based on the optically-readable token, and wherein the method further comprises determining the transaction based on the token information.

5. The method of claim 1, further comprising authenticating the transaction based on the first message.

6. The method of claim 1, wherein the first optically-readable code comprises one of:

a quick-response (QR) code; or a bar code.

7. An apparatus comprising:

one or more processors; and memory storing instructions that, when executed by the one or more processors, cause the apparatus to:

cause display of a first optically-readable code that indicates a first location and first time information;

based on a first message, sent from a mobile device and that is based on the first optically-readable code, send a second message associated with a first portion of a transaction with the mobile device;

cause display of a second optically-readable code that indicates a second location and second time information;

based on a third message sent from the mobile device and that is based on the second optically-readable code, determine a time difference based on the first time information and the second time information; and based on the second location matching the first location and the time difference satisfying a timeframe criterion, send a fourth message associated with a second portion of the transaction.

8. The apparatus of claim 7, wherein satisfying the timeframe criterion comprises the time difference being less than a threshold amount of time.

9. The apparatus of claim 7, wherein the first optically-readable code comprises a token that is generated based on the first location, a first time, and seed information.

10. The apparatus of claim 7, wherein the first optically-readable code comprises an optically-readable token, wherein the first message comprises token information based on the optically-readable token, and wherein the instructions, when executed by the one or more processors, further cause the apparatus to determine the transaction based on the token information.

11. The apparatus of claim 7, wherein the instructions, when executed by the one or more processors, further cause the apparatus to authenticate the transaction based on the first message.

12. The apparatus of claim 7, wherein the first optically-readable code comprises one of:

a quick-response (QR) code; or a bar code.

13. The apparatus of claim 7, wherein the first optically-readable code indicates a software application, and wherein the first message is generated at least in part by the software application executing on the mobile device.

14. A non-transitory computer-readable medium storing instructions that, when executed, configure a computing device to:

send, based on a received first message that is based on a first optically-readable code, a second message associated with a first portion of a transaction, wherein the first optically-readable code comprises first location information and first time information; and send, based on a received third message that is based on a second optically-readable code, a fourth message associated with a second portion of the transaction, wherein the second optically-readable code comprises second location information and second time information, and wherein the sending the fourth message is further based on the first location information, the second location information, the first time information, and the second time information.

15. The non-transitory computer-readable medium of claim 14, wherein the instructions, when executed, configure the computing device to send the fourth message further based on the first time information and the second time information by:

sending the fourth message further based on a time difference, that is based on the first time information and the second time information, satisfying a timeframe criterion.

16. The non-transitory computer-readable medium of claim 14, wherein the instructions, when executed, configure the computing device to send the fourth message further based on the first location information and the second location information by:

sending the fourth message further based on a location associated with the second location information matching a location associated with the first location information.

17. The non-transitory computer-readable medium of claim 14, wherein the instructions, when executed, further configure the computing device to determine the transaction based on the first message.

18. The non-transitory computer-readable medium of claim 14, wherein the instructions, when executed, configure the computing device to authenticate the transaction based on the first message.

19. The non-transitory computer-readable medium of claim 14, wherein the first optically-readable code comprises one of:

a quick-response (QR) code; or a bar code.

20. The non-transitory computer-readable medium of claim 14, wherein the first optically-readable code indicates a software application, and wherein the first message is generated at least in part by executing the software application on a mobile device that has read the first optically-readable code.

* * * * *